Jan. 29, 1929.

E. E. WEMP 1,700,244

CLUTCH

Filed Jan. 3, 1927

INVENTOR
Ernest E. Wemp

BY Stuart C. Barnes
ATTORNEY

Jan. 29, 1929.

E. E. WEMP 1,700,244

CLUTCH

Filed Jan. 3, 1927

INVENTOR
Ernest E. Wemp

BY Stuart C. Barnes
ATTORNEY

Jan. 29, 1929.  
E. E. WEMP  
1,700,244  
CLUTCH  
Filed Jan. 3, 1927  3 Sheets-Sheet 3
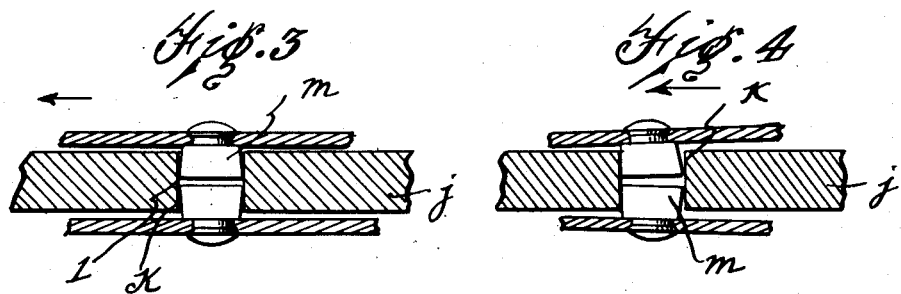
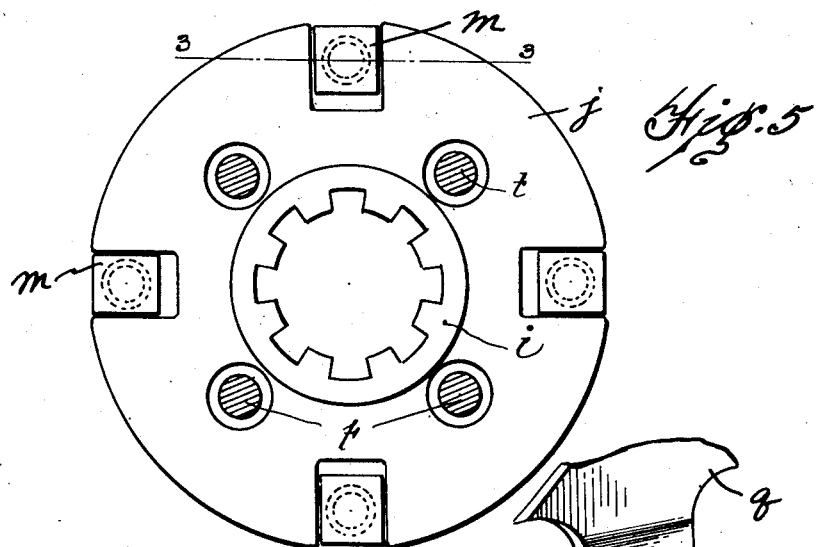
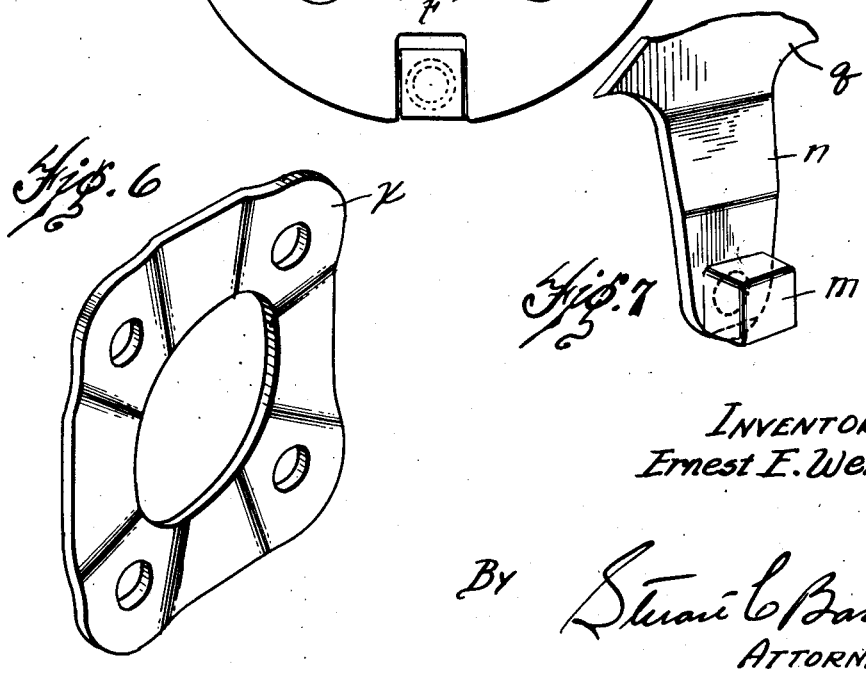
INVENTOR  
Ernest E. Wemp  
By Stuart C. Barnes  
ATTORNEY Patented Jan. 29, 1929.

1,700,244

UNITED STATES PATENT OFFICE.

ERNEST E. WEMP, OF DETROIT, MICHIGAN.

CLUTCH.

Application filed January 3, 1927. Serial No. 158,507.

This invention relates to clutches, and particularly clutches for automobiles. It is the object of the invention to provide a clutch which is provided with a vibration dampening action. This is not broadly new, but I have designed a new arrangement of elements to accomplish this purpose in which a metallic or spring member instead of a deformable rubber or fabric rubber member gives a permissible limited movement and furnishes the power to return the parts to their normal position after the sudden change of load. The vibration dampening part is an adjustable friction member, preferably a braking member having a brake lining. This member not only resists the relative movement of the parts, but prevents the oscillations and dampens the vibration. The action of this part is nicely adjustable, as will be more fully explained hereafter.

Another feature of the invention is that as the relative movement of the parts increases the resistance is automatically increased by a change of leverage in some of the parts offering the resistance.

Fig. 3 is a cross section through the connection between the driven disk and the hub flange, taken on line 3—3 of Fig. 5.

Fig. 4 is a similar view showing the position assumed by the parts under the sudden increase in load.

Figure 1:
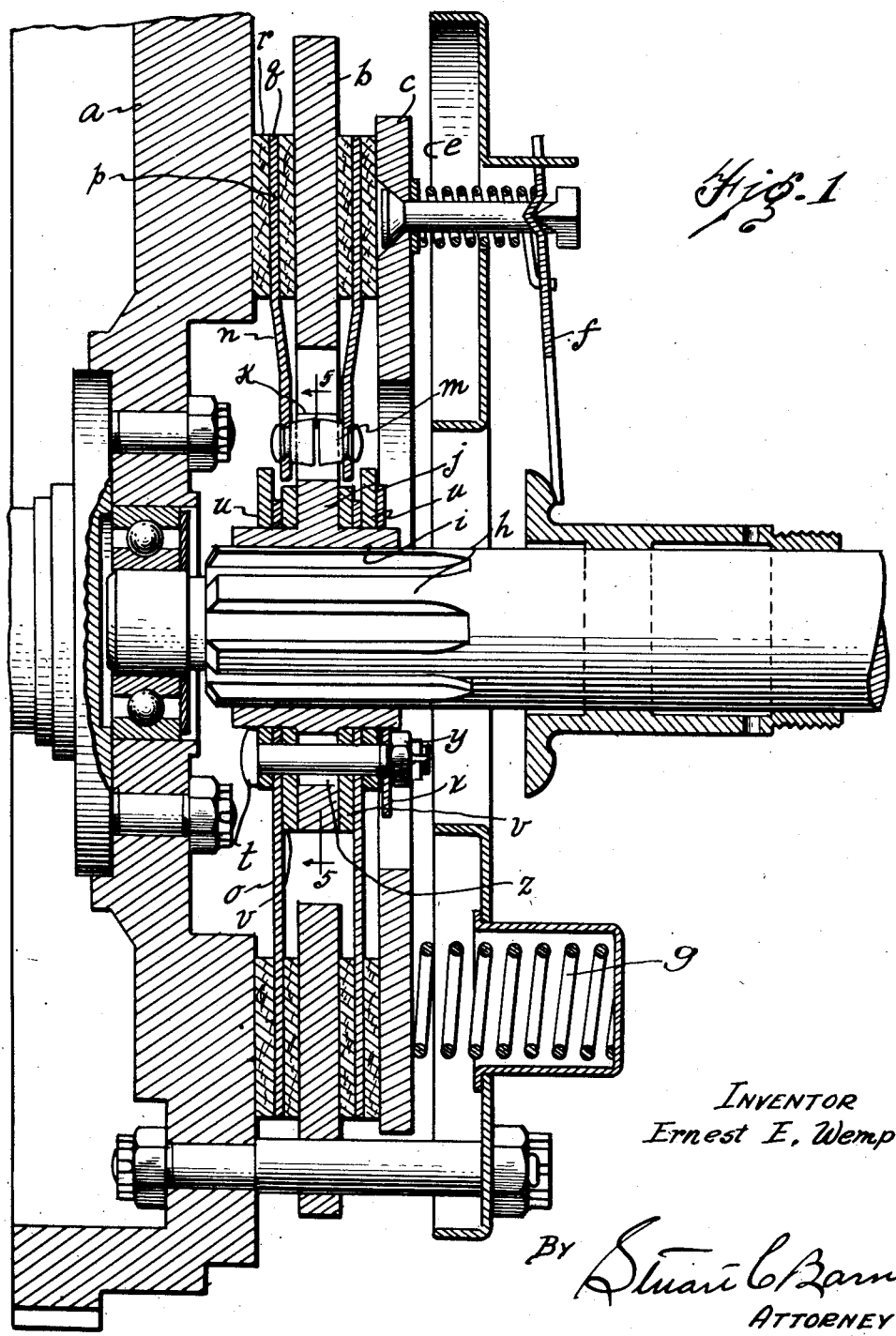
Fig. 1 is a longitudinal section of a multi-plate clutch embodying my invention.
Figure 2:
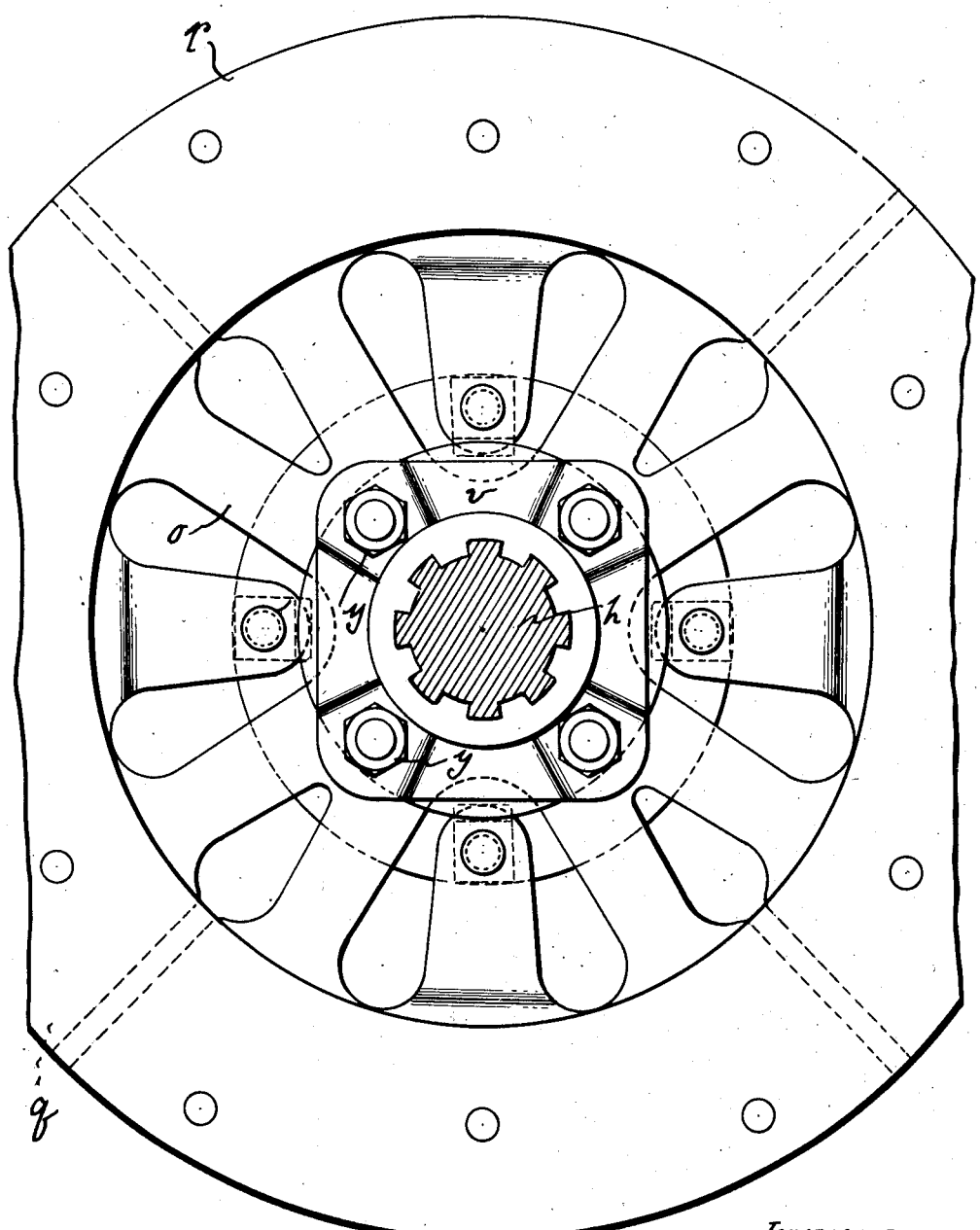
Fig. 2 is a rear elevation of the same.

Fig. 5 is a section on the line 5—5 of Fig. 1.

Fig. 6 is a detailed perspective of the spring pressure plate.

Fig. 7 is a detail of one of the torsion arms of the driven disk.

$a$ designates the fly-wheel, $b$ the driving disk, $c$ the usual pressure plate, $e$ the cover plate. The levers $f$ can be used to release the pressure of the spring $g$ in a well-known way, which needs no description here. The end of the driven shaft is provided with splines $h$, on which slide the hub $i$, provided with the hub flange $j$.

This hub flange is notched as at $k$ to receive the driving blocks $m$. These are tapered end from end, and are preferably square. They are riveted to the torsion arms $n$ of the driven plates $p$. These driven plates have the spokes $o$ connecting (preferably) two with each segment $q$ of the rim. The clutch facings $r$ are riveted to the four segments.

Looking at the lower portion of Fig. 1, it will be seen that these spokes $o$ are clamped by the bolts $t$ to the collars $u$; (however, these may be omitted), and to the brake facings $v$. This clamping is through the interposition of a corrugated spring pressure plate $x$. Hence, it will be apparent that by tightening or loosening the nuts $y$ the amount of pressure on the brake facings can be altered. The clearance as at $z$, is provided between some of the members so that relative movement is permissible. Here the clearance is shown in the hub flange.

The operation is as follows: Looking at Fig. 3 and assuming that the blocks are being driven in the direction of the arrow, a sudden increase of the load causes the driving block $m$ to turn on the fulcrum $l$ until it has taken up all the clearance, which here is about forty-thousandths of an inch, and which at the rim will permit a relative movement of one hundred to one hundred and twenty-thousandths of an inch. Of course, these dimensions may be varied; this is only an example. This tends to twist the torsion arms $n$, which, being made of spring metal, tend to resist this strain. However, as the blocks roll on the fulcrum points, it will be seen that the lever arm of the block which is tending to twist the torsion arm, decreases in the length of its power arm, and consequently the resistance of the torsion arm gradually increases due to the decrease of the leverage of the load. The lever arm of the block is the distance between the point of contact of the block with the hub flange $j$ and the axis of the torsion arm. As the block rolls on the flange this arm decreases in length as appears in Fig. 4.

These torsion arms function then to limit the amount of relative movement, and further store up power in which to swing the parts back to their normal position when the sudden change of the load is relieved.

A further resistance to the movement and a vibration dampener is afforded by the brake linings v, which tend to resist the relative movement of the parts in a degree, depending upon the pressure afforded by the distortion of the pressure plate x. This gives a snubbing action which tends to prevent rebounding action due to the metallic spring and successfully deadens and prevents vibration.

It will be seen from the above that I combine a metallic element which limits the relative movement and cushions it with an adjustable snubbing element of the brake type which acts as a vibration dampener. This, I believe to be a considerable improvement over some of the vibration dampeners heretofor proposed in which rubber and rubber impregnated fabrics are used. It is found that the action of fabric is so dependent on the exact fabric composition that considerable difficulty has been afforded. Furthermore, the introduction of a braking element in combination with the mechanical element to return the parts to their initial position has decided advantages. Again this construction is so easy and cheap to manufacture and it has considerable advantages from a production standpoint.

In the claims "an external surface-to-surface frictional braking action" etc. is used to distinguish from internal friction such as occurs in distorting fabric disks or rubber cushions. This is furnished in this embodiment by the brake linings X and hub flange j surfaces.

What I claim is:

1. In a clutch, the combination of a driven disk, a hub, and torsion arms for connecting the disc with the hub, said torsion arms arranged to twist and allow a limited movement between the hub and the disk for the purpose specified.

2. In a clutch, the combination of a driven disk, a hub on which the same is mounted, and yieldable torsion arms which permit a limited relative movement between the hub and the disk resisted by the twisting of the torsion arms, and a braking element between the hub and the disk also resisting relative movement.

3. In a clutch, the combination of a driven disk, a hub on which the same is mounted, and yieldable torsion arms which permit a limited relative movement between the hub and the disk resisted by the twisting of the torsion arms, and an adjustable pressure braking element between the hub and the disk also resisting the relative movement.

4. In a clutch, the combination of a hub provided with a notched flange, a driven disk provided with radial members which support the disk rotatably upon the hub and provided with torsion arms having tapered driving blocks that fit loosely into the notches of the hub flange.

5. In a clutch, the combination of a hub provided with a notched flange, a driven disk provided with radial members which support the disk rotatably upon the hub and provided with torsion arms having driving blocks that fit into the notches of the hub flange, and one or more braking elements between the center of the disk and the hub flange.

6. In a clutch, the combination of a hub provided with a notched flange, a driven disk provided with radial members which support the disk rotatably upon the hub, and provided with torsion arms having driving blocks that engage in the notches of the hub flange, and one or more braking elements between the center of the disk and the hub flange, and a spring pressure plate in connection with adjustable clamping means for securing the driven disk, the braking elements and the hub flange together in adjustable relation.

7. In a clutch for use in automobiles or other engine-driven vehicles, the combination of clutch elements arranged to provide a drive between the crank shaft and driven shaft yieldable within given limits, means for providing an external surface-to-surface frictional braking action within such given limits to dampen vibrations, and means for providing pressure between said frictional surfaces and automatically adjusting the position of the surfaces to compensate for wear, and means for adjusting the amount of such pressure.

8. In a clutch for use in automobiles or other engine-driven vehicles between the crank shaft end and the driven shaft end the combination of a driven member and hub capable of limited relative movement, mechanical spring means tending to oppose such relative movement, and separate independent braking means for providing external surface-to-surface friction to oppose said limited relative movement.

9. In a clutch for use in automobiles or other engine-driven vehicles between the crank shaft end and the driven shaft end the combination of a driven member and hub capable of limited relative movement, mechanical resilient means tending to oppose such relative movement, and separate independent braking means for providing external surface-to-surface friction to oppose said limited relative movement.

10. In a clutch for use in motor vehicles between the end of the crank shaft and the end of the driven shaft, the combination of a driven member and hub capable of limited relative movement, resilient means tending to oppose such relative movement, and separate independent braking means for providing external surface-to-surface friction to oppose said limited relative movement, and spring means for holding said surfaces together under yieldable pressure.

11. In a clutch for use in motor vehicles between the end of the crank shaft and the end of the driven shaft, the combination of a driven member and hub capable of limited relative movement, spring means tending to oppose such relative movement, separate independent braking means for providing external surface-to-surface friction to oppose said limited relative movement, spring means for holding said surfaces together under yieldable pressure, and means for adjusting the amount of such yieldable pressure.

In testimony whereof I have affixed my signature.

ERNEST E. WEMP.